(12) United States Patent
Matsuda

(10) Patent No.: US 12,447,668 B2
(45) Date of Patent: Oct. 21, 2025

(54) IMPRINT DEVICE, IMPRINT METHOD, ARTICLE MANUFACTURING METHOD, AND STORAGE MEDIUM

(71) Applicant: CANON KABUSHIKI KAISHA, Tokyo (JP)

(72) Inventor: Hiroyuki Matsuda, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 188 days.

(21) Appl. No.: 18/300,538

(22) Filed: Apr. 14, 2023

(65) Prior Publication Data
US 2023/0390993 A1 Dec. 7, 2023

(30) Foreign Application Priority Data

Jun. 2, 2022 (JP) .................................. 2022-090048

(51) Int. Cl.
*B29C 59/02* (2006.01)
*B29C 59/00* (2006.01)
*G06V 10/145* (2022.01)
*G06V 10/22* (2022.01)

(52) U.S. Cl.
CPC .......... *B29C 59/022* (2013.01); *B29C 59/002* (2013.01); *G06V 10/145* (2022.01); *G06V 10/22* (2022.01); *G06V 2201/07* (2022.01)

(58) Field of Classification Search
None
See application file for complete search history.

(56) References Cited

U.S. PATENT DOCUMENTS

2018/0259863 A1* 9/2018 Komaki .................... G01D 5/28
2019/0285996 A1* 9/2019 Shibayama ............. B29C 43/04

FOREIGN PATENT DOCUMENTS

| JP | 2018061061 A | 4/2018 |
| KR | 1020060128673 A | 12/2006 |
| KR | 1020160120676 A | 10/2016 |
| KR | 1020190089212 A | 7/2019 |

OTHER PUBLICATIONS

Office Action issued in Korean Appln. No. 10-2023-0066076 mailed on Jul. 23, 2025.

* cited by examiner

*Primary Examiner* — Yung-Sheng M Tsui
(74) *Attorney, Agent, or Firm* — ROSSI, KIMMS & McDOWELL LLP

(57) ABSTRACT

The present invention is to provide an imprint device that can form a circuit pattern with high accuracy even if a deviation occurs in a positional relationship between the circuit pattern and an alignment mark. The imprint device performs an imprinting process in which a mold on which a pattern is formed is brought in contact with an imprint material on a substrate and the pattern is transferred to the substrate at a target position on the substrate, and includes an alignment unit that performs alignment of the mold with the substrate such that the mold and the substrate are at an alignment position corrected based on an amount of relative positional deviation between a pattern mark formed near the pattern of the mold and an alignment mark of the mold obtained by measuring the pattern mark and the alignment mark, and a curing unit that cures the imprint material at the position at which alignment is performed by the alignment unit.

12 Claims, 14 Drawing Sheets

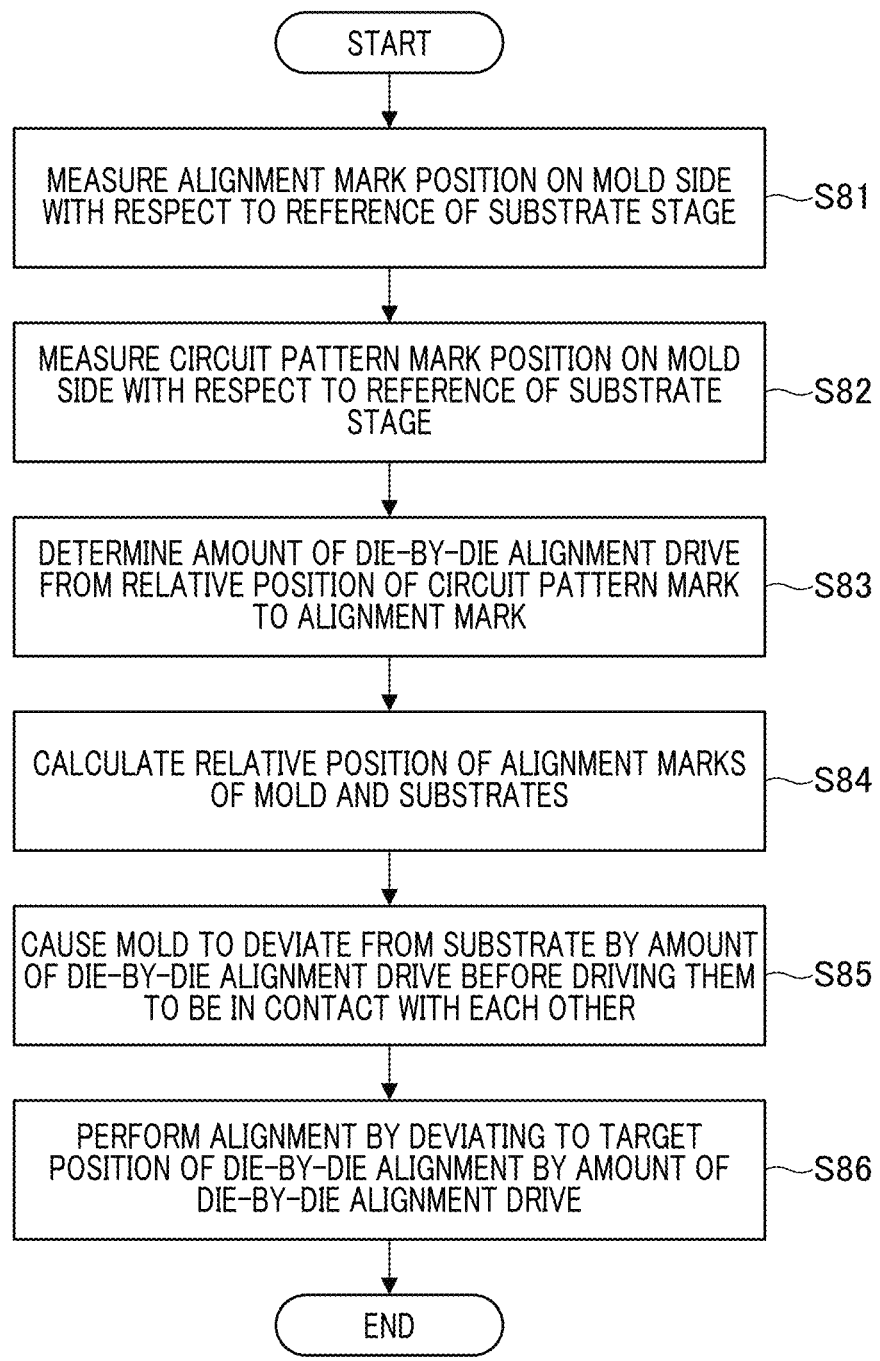

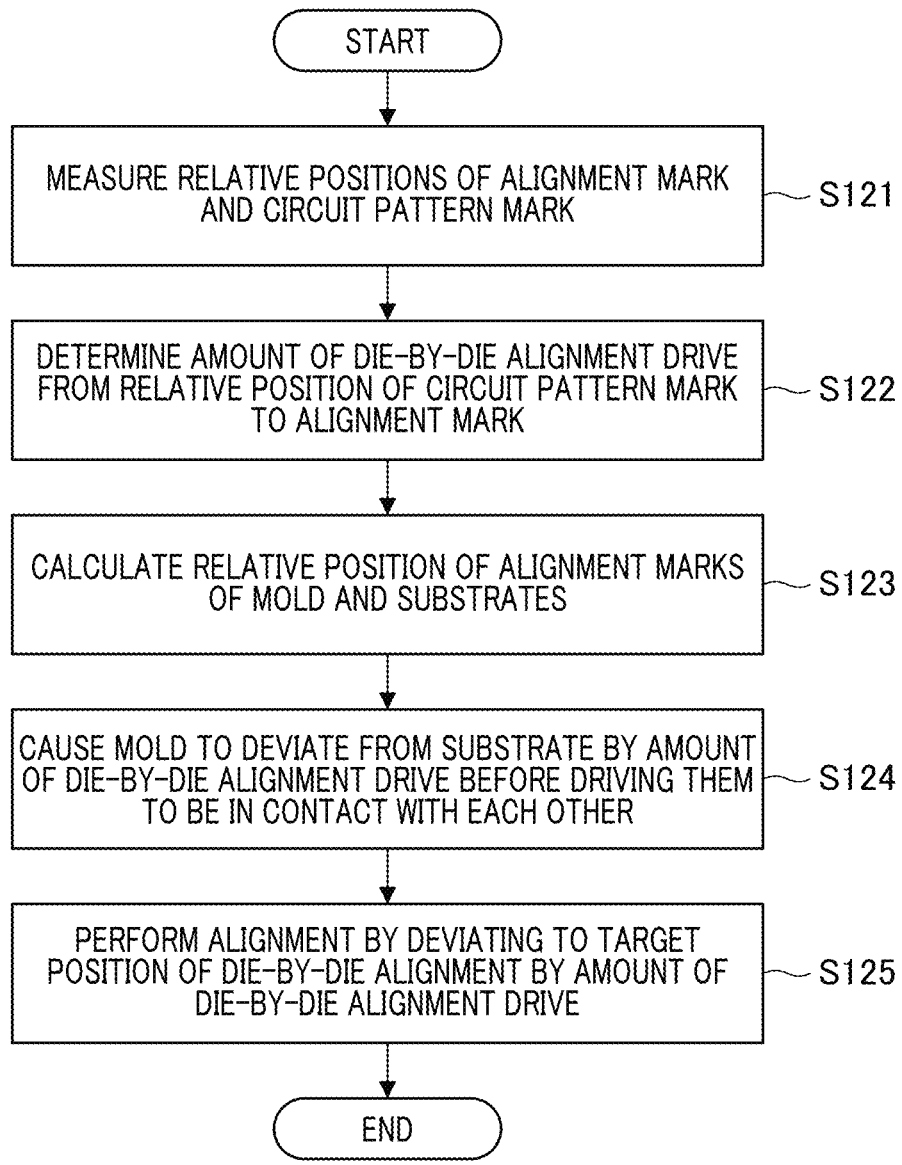

IMPRINT DEVICE, IMPRINT METHOD, ARTICLE MANUFACTURING METHOD, AND STORAGE MEDIUM

BACKGROUND OF THE INVENTION

Field of the Invention

The present invention relates to an imprint device, an imprint method, an article manufacturing method, and a storage medium.

Description of the Related Art

An imprint device for molding an imprint material on a substrate by using a mold with a pattern surface on which a pattern has been formed has gained attention as a mass-production lithography device of a semiconductor device or the like. The imprint device cures an imprint material on the substrate while the imprint material is in contact with the mold, then separates the mold from the cured imprint material, and thus can form the uneven pattern of the imprint material on the substrate.

A die-by-die alignment method is generally used for imprint devices for alignment with a pattern on a substrate. The method involves measuring a relative positional deviation between an original plate (mold) and a substrate with reference to alignment marks drawn on the mold and the substrate and driving the substrate and the mold while they are in contact with each other to correct the amount of the deviation in order to perform satisfactory alignment. Japanese Patent Application Laid-Open No. 2018-61061 discloses a configuration for performing die-by-die alignment with high accuracy by shifting the mold before bringing it in contact with the substrate.

However, in the mold manufacturing step, a layer on which a circuit pattern is created and a layer on which an alignment mark is created are sometimes processed in different steps. In this case, a deviation may occur in the positional relationship between the circuit pattern and the alignment mark depending on the alignment accuracy of the mold manufacturing device. When the mold is used for alignment with the substrate by using the alignment marks formed on the mold and the substrate to form the uneven pattern on the substrate, if a deviation is significant, the circuit pattern is not likely to be formed at the correct position on the substrate even if the alignment has been performed.

Therefore, one objective of the present invention is to provide an imprint device that can form a circuit pattern with high accuracy even if a deviation occurs in a positional relationship between the circuit pattern and an alignment mark.

SUMMARY OF THE INVENTION

To achieve the objective, an imprint device according to an aspect of the present invention is an imprint device that performs an imprinting process in which a mold on which a pattern is formed is brought in contact with an imprint material on a substrate and the pattern is transferred to the substrate at a target position on the substrate, the imprint device including at least one processor or circuit configured to function as an alignment unit that performs alignment of the mold with the substrate such that the mold and the substrate are at an alignment position corrected based on an amount of relative positional deviation between a pattern mark formed near the pattern of the mold and an alignment mark of the mold obtained by measuring the pattern mark and the alignment mark, and a curing unit that cures the imprint material at the position at which alignment is performed by the alignment unit.

Further, features of the present invention will become apparent from the following description of embodiments with reference to the attached drawings.

BRIEF DESCRIPTION OF THE DRAWINGS

FIG. 8 is a flowchart showing an example of an alignment method in which an amount of relative positional deviation between a circuit pattern mark 40 and an alignment mark 10 is calculated and the amount of relative positional deviation is reflected as a die-by-die alignment driving position.

FIG. 12 is a flowchart showing an example of an alignment method in which an amount of relative deviation is reflected as a die-by-die alignment driving position.

DESCRIPTION OF THE EMBODIMENTS

Hereinafter, with reference to the accompanying drawings, favorable modes of the present invention will be described using Embodiments. In each diagram, the same reference signs are applied to the same members or elements, and duplicate description will be omitted or simplified.

First Embodiment

Figure 1:
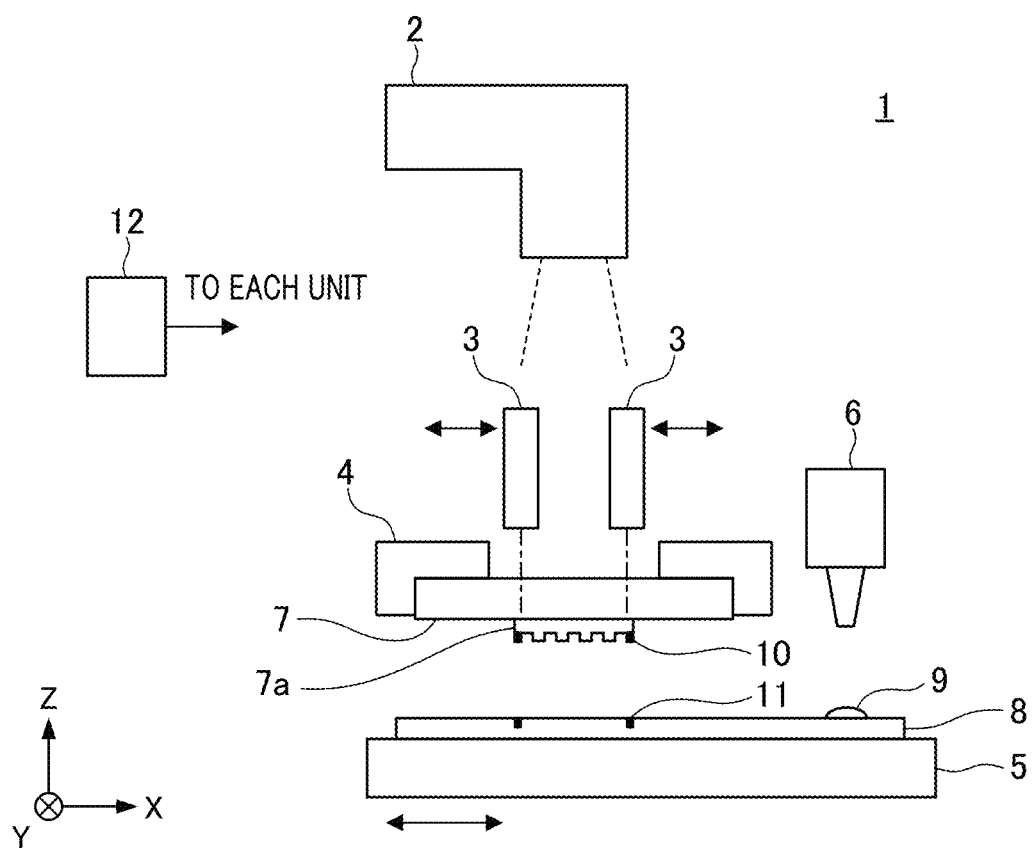
FIG. 1 is a diagram illustrating a configuration example of an imprint device 1 according to a first embodiment.

First, a configuration of an imprint device that uses an imprint method according to a first embodiment of the present invention will be described. FIG. 1 is a diagram illustrating a configuration example of an imprint device 1 according to the first embodiment.

The imprint device 1 brings an imprint material supplied onto a substrate in contact with a mold, then applies energy (e.g., ultraviolet rays) for curing the imprint material, and thereby forms the pattern of the cured material to which an uneven pattern of the mold has been transferred. In other words, an imprinting process in which the mold on which the pattern is formed is brought in contact with the imprint material on the substrate and the pattern of the mold is transferred to the substrate at a target position thereon is performed.

In FIG. 1, an X axis and a Y axis are set orthogonal to each other within a plane parallel to the surface of the substrate, and a Z axis is set in a direction orthogonal to the X and Y axes. The imprint device 1 includes a radiation unit 2 that radiates light, a measurement unit 3 that performs measurement for alignment of a mold that is an original plate and a substrate, a mold holding unit 4 that holds a mold, a substrate stage 5 that holds a substrate, a supply unit 6 that supplies an imprint material, a control unit 12, and the like.

The radiation unit 2 performs a stamping process in which the mold 7 is brought in contact with the imprint material on the substrate 8, and then radiates ultraviolet rays to the mold 7 and the imprint material to cure the imprint material.

The predetermined pattern (e.g., a circuit pattern 7a with unevenness such as a circuit pattern) is formed in a three-dimensional shape on the surface of the mold 10 facing the substrate 8.

The mold holding unit 4 attracts and holds the mold 7 using vacuum adsorption force or electrostatic force. The mold holding unit 4 can include a mold chuck for adsorbing and holding the mold 7, and a mold drive mechanism that drives the chuck in the Z-axis direction. The mold drive mechanism performs an operation for bringing the mold 7 in contact with the imprint material supplied onto the substrate 8.

The substrate stage 5 is a substrate holding unit that holds the substrate 8 by using, for example, vacuum adsorption and enables the substrate 8 to be movable within the X-Y plane. Here, the substrate 8 is an object to be processed made of, for example, monocrystalline silicon, and the imprint material 9 to be molded by the mold 7 is supplied onto the surface to be processed from a supply unit 6.

The measurement unit 3 that performs measurement for aligning relative positions of the substrate 8 and the mold 7 optically detects a plurality of marks 10 disposed on the mold 7 or the mold holding unit 4 and a plurality of marks 11 disposed on the substrate 8 or the substrate stage 5 to measure relative positions between the marks. In the following description it will assumed that the marks 10 are disposed on the mold 7 and the marks 11 are disposed on the substrate.

The measurement unit 3 can be driven in the X-axis direction and the Y-axis direction according to positions of the marks disposed on the mold 7 or the substrate 8. Alternatively, the measurement unit 3 can be driven in the Z-axis direction as well to focus on positions of the marks.

The control unit 12 is electrically connected to the radiation unit 2, the measurement unit 3, the mold holding unit 4, the substrate stage 5, and the supply unit 6 to transmit a control command to each of the units or acquire information from each of the units. The control unit 12, for example, acquires information on relative positions between the marks measured by the measurement unit 3 and controls driving of a drive unit including the substrate stage 5 and mold magnification correction mechanism of the mold holding unit 4 based on the information.

In addition, the control unit 12 includes a CPU serving as a computer and a memory serving as a storage medium, and controls operations of each unit of the entire imprint device 1 based on a computer program stored in the memory.

Next, an imprinting process of the imprint device 1 will be described. First, a substrate transport unit, which is not illustrated, transports the substrate 8 onto the substrate stage 5, and thus the substrate 8 is placed and fixedly held. Next, the substrate stage 5 is moved to an imprint material supply position facing the supply unit 6, and then the supply unit 6 supplies an imprint material 9 to a shot region on the substrate 8 to be imprinted (supply step).

Next, the substrate stage 5 is moved to position the shot region of the substrate 8 right under the mold 7, and the mold driving mechanism is driven to bring the mold 7 in contact with the imprint material 9 on the substrate 8 (stamping step). This operation allows the imprint material 9 to flow along the circuit pattern 7a formed with unevenness on the mold 7.

Then, the marks 10 and 11 disposed respectively on the mold 7 and the substrate 8 are detected by the measurement unit 3, and thus the pattern surface of the mold 7 is aligned with the shot region on the substrate 8 due to driving of the substrate stage 5.

Then, the flow of the imprint material 9 along the circuit pattern 7a with unevenness and alignment between the mold 7 and the substrate 8 are sufficiently completed. In this state, the radiation unit 2 radiates ultraviolet rays from the back surface (top surface) of the mold 7 to cure the imprint material 9 with the ultraviolet rays that have passed through the mold 7 (curing step). In other words, the imprint material is cured at the aligned position. At this time, the control unit functions also as a curing unit.

At this time, the measurement unit 3 is disposed at a position at which the measurement unit 3 does not block the optical path of the ultraviolet rays. Then, the mold drive mechanism is driven again to separate the mold 7 from the cured imprint material 9 (demolding step). Through the above steps, the circuit pattern 7a with unevenness of the mold 7 is transferred to the imprint material 9 on the substrate 8.

Figure 2:
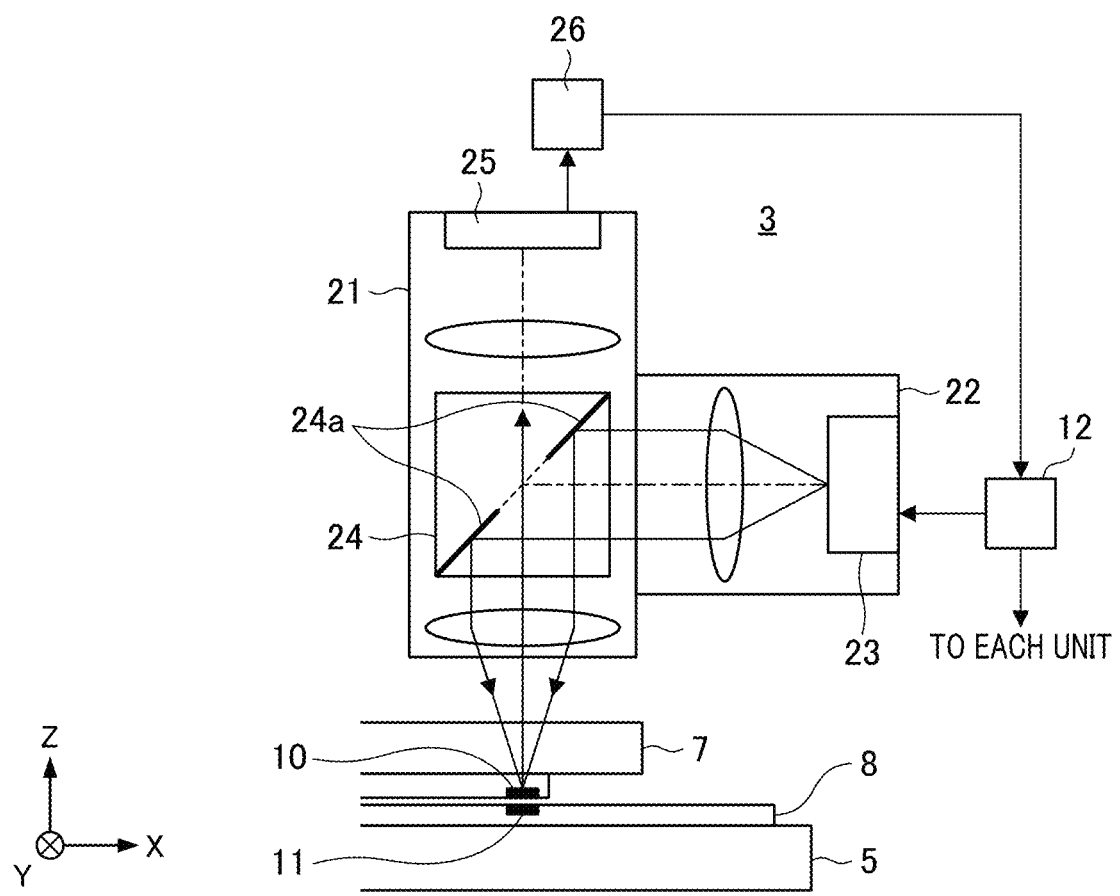
FIG. 2 is a diagram illustrating an example of a configuration example of a measurement unit 3 according to the first embodiment.

Next, the measurement unit 3 and the alignment marks 10 and 11 disposed respectively on the mold 7 and the substrate 8 will be described in detail. FIG. 2 is a diagram illustrating an example of a configuration of the measurement unit 3 according to the first embodiment.

The measurement unit 3 includes a detection optical system 21 (detection unit), an illumination optical system 22 (illumination unit), a processing unit 26, and the like, and is controlled by the control unit 12. The illumination optical system 22 guides light from a light source unit 23 onto the same optical axis as that of the detection optical system 21 by using a prism 24 or the like to illuminate the marks 10 and 11.

For the light source unit 23, for example, a halogen lamp, an LED, a semiconductor laser (LD), a high-pressure mercury lamp, or a metal halide lamp may be used, from which visible light or infrared light that does not include ultraviolet light that cures the imprint material may be radiated. The control unit 12 controls driving of the light source unit 23.

The detection optical system 21 and the illumination optical system 22 share a part of the optical members forming the systems, and the prism 24 is disposed on the pupil plane of the detection optical system 21 and the illumination optical system 22 or disposed near the pupil plane. The detection optical system 21 forms an image of the marks 10 and 11 illuminated by the illumination optical system 22 on the light-receiving surface of an imaging unit 25.

For the imaging unit 25, an image sensor such as a CCD or a CMOS is used. The processing unit 26 acquires and processes data of an image captured by the imaging unit 25. The processing unit 26 is, for example, a part of the control unit 12, acquires information of an image captured by the imaging unit 25, and obtains relative positions of the marks 10 and 11 through calculation based on the image.

The control unit 12 controls an alignment part based on the obtained relative positions and performs alignment such that a deviation in relative positions of regions at least including the marks 10 and 11 is small.

Figure 3A:
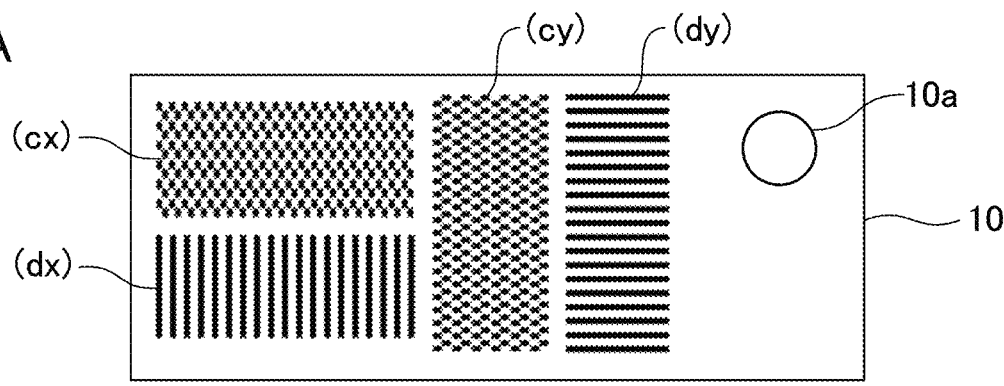
FIGS. 3A to 3D are diagrams for describing examples of alignment marks in detail.
Figure 3B:
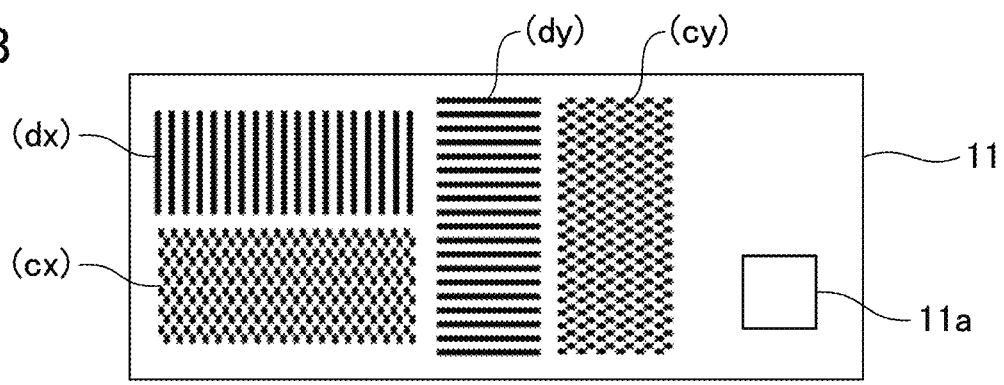

Next, details of the marks 10 and 11 will be described. FIGS. 3A to 3D are diagrams for describing examples of the alignment marks in detail, and FIG. 3A is a diagram illustrating an example of a mark 10. Each of a plurality of marks 10 includes diffraction grating marks (cx), (cy), (dx), and (dy) forming moire for accuracy measurement, and a roughness measurement mark 10a FIG. 3B is a diagram illustrating an example of a mark 11, and each of a plurality of marks 11 includes diffraction grating marks (cx), (cy), (dx), and (dy) forming moire for accuracy measurement, and a roughness measurement mark 11a.

Figure 3C:
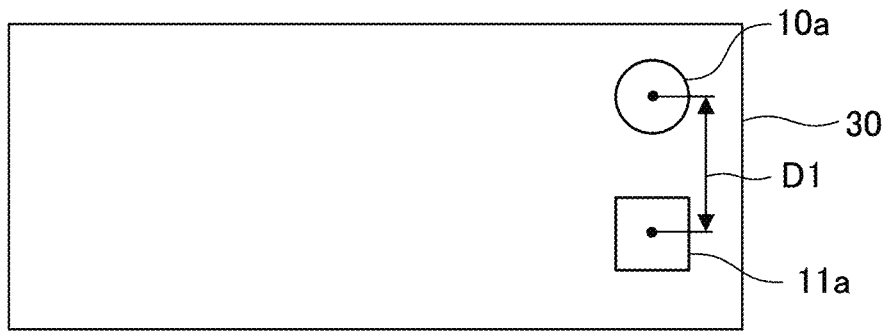

FIG. 3C is a diagram schematically illustrating an image 30 of alignment marks used for roughness measurement before the mold 7 comes in contact with the substrate 8. The roughness measurement mark 10a on the mold 7 side and the roughness measurement mark 11a on the substrate 8 side are captured by the imaging unit 25 during roughness measurement as illustrated in FIG. 3C. Then, an amount of positional deviation D1 between the roughness measurement mark 10a and the roughness measurement mark 11a is obtained with reference to the geometric center position (centers of gravity) of each of the roughness measurement mark 10a on the mold 7 side and the roughness measurement mark 11a on the substrate 8 side.

Because the roughness measurement mark 10a and the roughness measurement mark 11a are designed to be separated from each other as far as a predetermined reference distance, the difference between the reference distance and the amount of positional deviation D1 is the deviation in the relative positions of the roughness measurement mark 10a and the roughness measurement mark 11a. Roughness is measured as described above by using the roughness measurement mark 10a and the roughness measurement mark 11a.

Figure 3D:
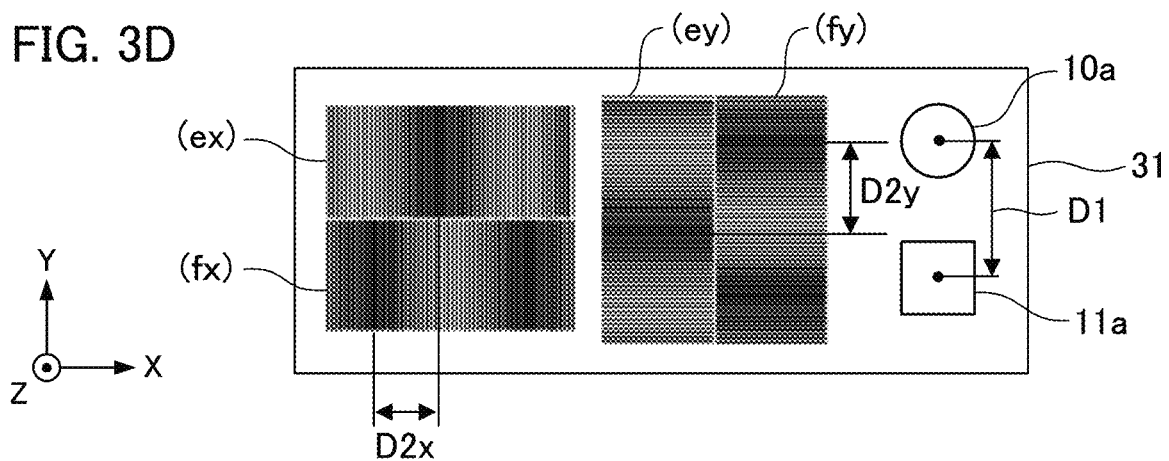

FIG. 3D is a diagram schematically illustrating an image 31 of alignment marks used precisely measured while the mold 7 is in contact with the substrate 8. Although the diffraction grating mark (cx) on the mold 7 side and the diffraction grating mark (dx) on the substrate 8 side are diffraction gratings each having a cycle in the X axis direction, the marks (cx) and (dx) have different cycles as illustrated in FIG. 3D.

In addition, although the diffraction grating mark (cy) on the mold 7 side and the diffraction grating mark (dy) on the substrate 8 side are diffraction gratings each having a cycle in the Y axis direction, the marks (cy) and (dy) have different cycles.

When diffraction gratings with different cycles are overlapped, diffracted light beams from the diffraction gratings overlap, and thus moire having a cycle to which the different cycles have been reflected is generated like the diffraction gratings (ex) and (ey). Because the phase of the moire changes due to the relative positions of the diffraction gratings at that time, relative positions of the mold 7 and the substrate 8 can be obtained by detecting the moire.

In addition, the diffraction grating mark (dx) on the mold 7 side and the diffraction grating mark (cx) on the substrate 8 side, and the diffraction grating mark (dy) on the mold 7 side and the diffraction grating mark (cy) on the substrate 8 side are provided as another set of diffraction gratings, and the cycle magnitude relationship of the marks in the measurement direction is switched. For this reason, when the relative positions of the mold 7 and the substrate 8 are changed, two moire fringes generated due to the two sets of diffraction gratings move in opposite directions.

Thus, relative positions of the diffraction gratings can be measured with high accuracy by obtaining amounts of positional deviations D2x and D2y of the two moire fringes. Because the moire fringes are generated only when the mold 7 is in contact with the imprint material on the substrate 8 and two diffraction gratings are sufficiently close to overlap each other, the moire fringes cannot be observed and only roughness can be measured before the mold 7 is in contact with the substrate 8 as illustrated in FIG. 3C. Thus, after roughness measurement is finished, accurate measurement using moire fringes is possible in the state in which the mold 7 is in contact with the imprint material on the substrate 8.

In addition, because the moire fringes periodically appear in the same light amount distribution as the amount of relative positional deviation between the marks on the mold 7 side and the marks on the substrate side becomes greater, the measurement range of the relative positions is as small as the range of one cycle.

For this reason, the relative positional deviation between the mold 7 and the substrate 8 can be checked in a range greater than one cycle by using the roughness measurement mark 10a on the mold 7 side and the roughness measurement mark 11a on the substrate 8 side having a wider measurement range. By doing this, the pattern of the substrate can be overlapped with the pattern of the mold with high accuracy.

Normally, the marks 10 and the marks 11 are disposed at the four corners of each of the mold and the shot region, and relative positions of all of the marks are obtained, and an XY deviation, a rotation deviation, a magnification deviation, and the like are calculated. Details thereof will be omitted, and only a deviation in the X and Y axis directions will be described. In addition, details of a shape of marks will be omitted here since it is of a related art. Description will be provided below on the premise of one mark that enables measurement at the same time in the X and Y axis directions.

Figure 4A:
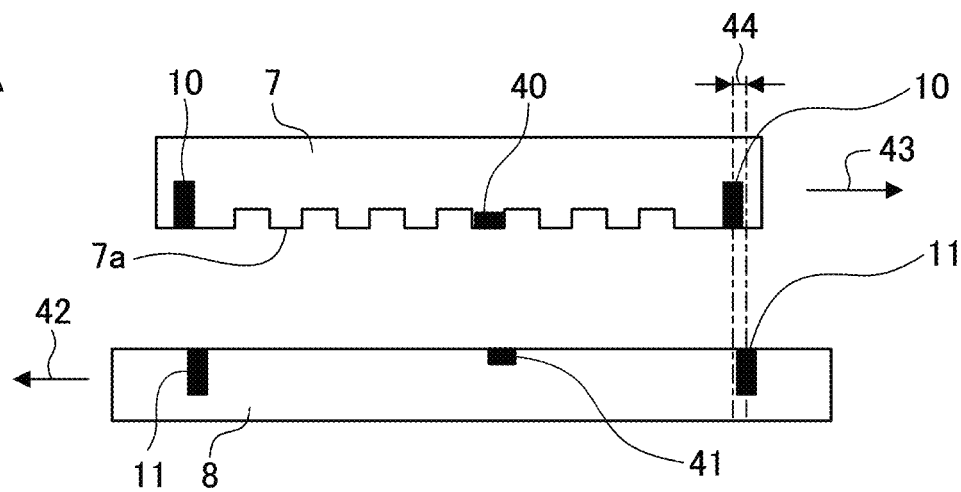
FIGS. 4A to 4C are schematic diagrams illustrating an imprinting process of the related art.
Figure 4B:
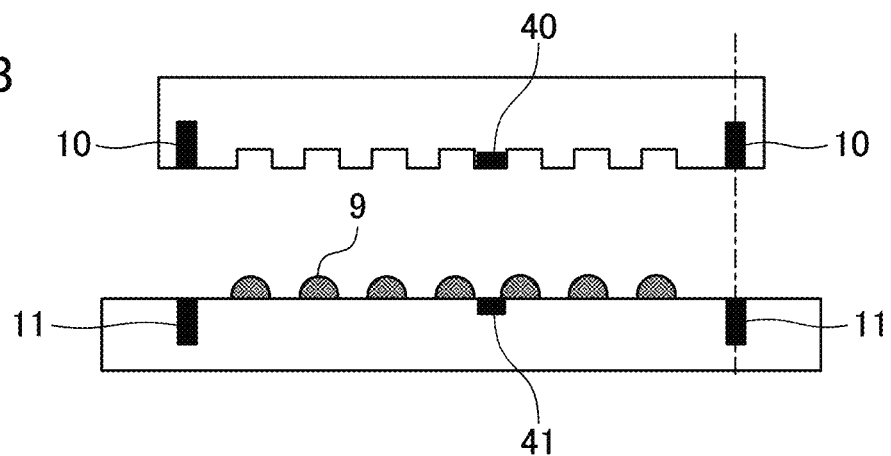
Figure 4C:
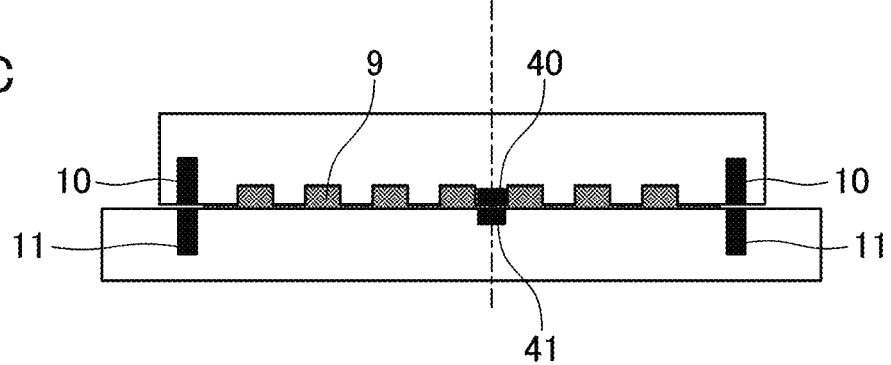

FIGS. 4A to 4C are schematic diagrams illustrating an imprinting process of the related art, and FIG. 4A is a schematic diagram illustrating an example in which the circuit pattern 7a of the mold 7 deviates to the left side of the drawing by an amount of relative deviation 44. The substrate stage drives the substrate 8 to the left side of the drawing for alignment as indicated by the arrow 42. In contrast, the circuit pattern 7a of the mold 7 is the same as being driven in the direction of the arrow 43.

FIG. 4B is a schematic diagram illustrating a state in which the alignment marks 10 on the mold side are aligned with the alignment marks 11 of the shot region based on roughness measurement and an imprint material has been supplied onto the substrate before the mold comes in contact with the substrate. FIG. 4C is a schematic diagram illustrating a state in which the alignment marks 10 on the mold side are aligned with the alignment marks 11 of the shot region based on precision measurement while the mold is in contact with the substrate.

The alignment method of FIGS. 4A to 4C is a method called a die-by-die alignment method in which a mold directly matches a shot for each shot. Advantages of the method is that an error is not likely to occur due to alignment is performed directly to each shot.

The circuit pattern mark 40 formed on the mold side and the alignment mark 41 on the substrate side illustrated in FIGS. 4A to 4C are marks for measuring overlap precision with a separate measurement device later, which is, for example, a box-in-box mark.

A case in which the position of the alignment mark 41 on the substrate side matches the position of the circuit pattern mark 40 on the mold side indicates that there is no substantial overlap error of the circuit pattern mark due to alignment of the alignment marks as illustrated in FIG. 4C. Further, the circuit pattern mark 40 is disposed near the circuit pattern 7a and functions as a pattern mark.

Figure 5:
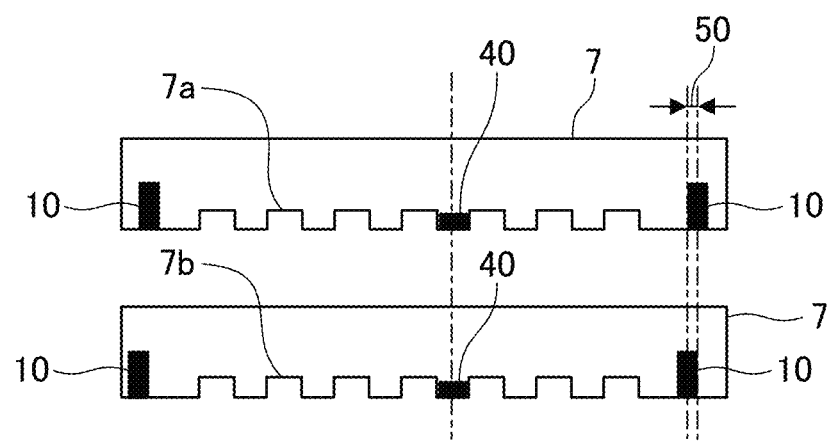
FIG. 5 is a schematic diagram for describing a relationship between an alignment mark and a circuit pattern mark when the marks are far apart.

FIG. 5 is a schematic diagram for describing a relationship of marks when an alignment mark and the circuit pattern mark are far apart. The alignment marks 10 of the circuit pattern 7a of FIG. 5 is indicated as not deviating from the circuit pattern mark 40, and the alignment mark 10 of a circuit pattern 7b is deviating from the circuit pattern mark 40 to the left side of the drawing by an amount of deviation 50.

The reason for this is that the circuit pattern mark 40 and the alignment marks 10 are formed in different steps in a mold manufacturing step, and the circuit pattern mark 40 may deviate from the alignment marks 10 depending on alignment precision of the mold manufacturing device. In other words, because the circuit pattern mark 40 and the circuit pattern 7a are formed on the mold in the same layer (same timing) in the manufacturing step, no deviation occurs.

On the other hand, because the circuit pattern mark 40 and the circuit pattern 7a are formed on the mold in the different layer (different timing) from that of the alignment marks 10 in the manufacturing step, there is a possibility of a deviation occurring in their positional relationship. For this reason, there is a possibility of the circuit pattern mark 40 not being aligned at a desired position even if the alignment is performed using the alignment marks 10.

Figure 6A:
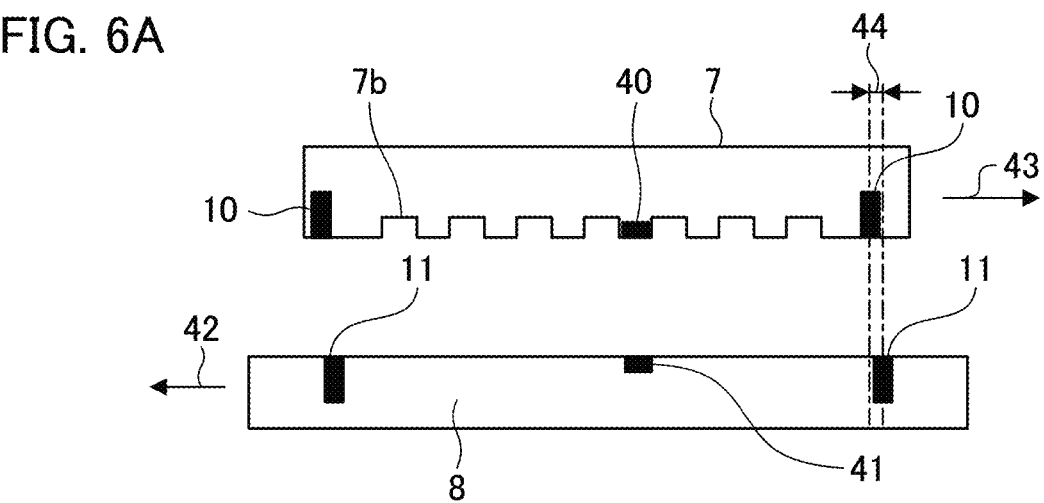
FIGS. 6A to 6C are schematic diagrams illustrating alignment of a mold 7 on which a circuit pattern 7b is formed by using alignment marks 10 in the same manner as in FIG. 4.
Figure 6B:
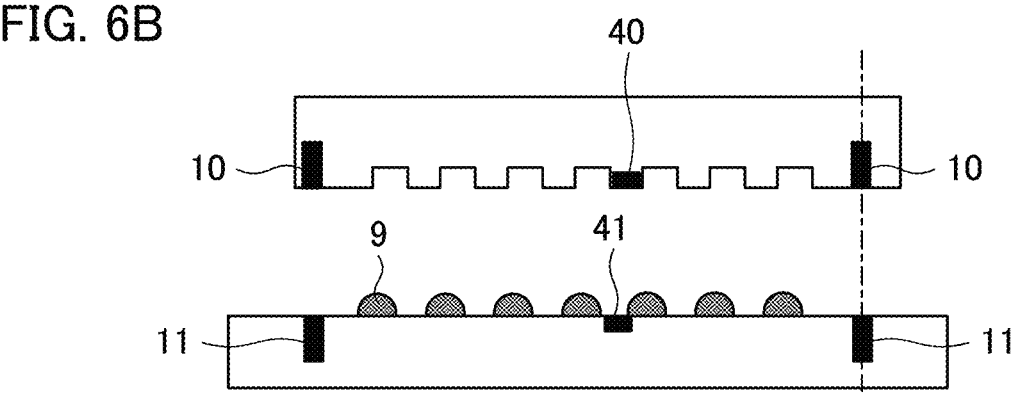
Figure 6C:
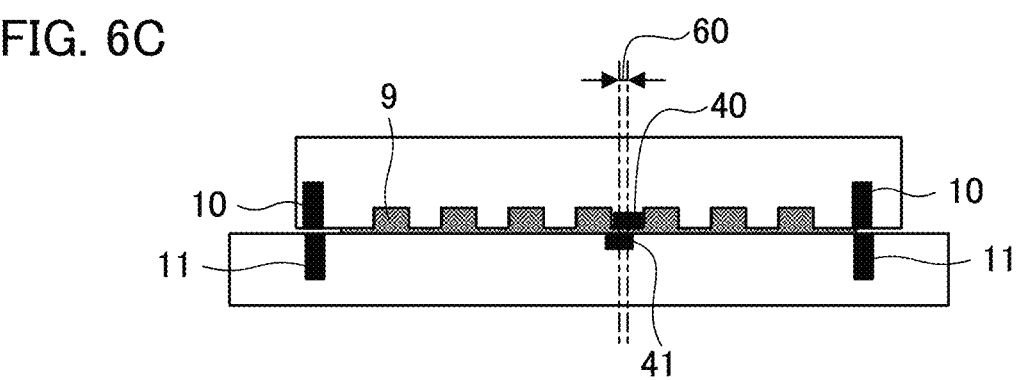

FIGS. 6A to 6C are schematic diagrams illustrating alignment of a mold 7 on which a circuit pattern 7b is formed by using the alignment marks 10 in the same manner as in FIG. 4, and FIG. 6A is a schematic diagram schematically illustrating an example in which the circuit pattern 7b of the mold 7 deviates to the left side of the drawing by an amount of relative deviation 44.

In the example of FIG. 6, the substrate stage drives the substrate 8 to the left side of the drawing based on roughness measurement as indicated by the arrow 42. In contrast, the circuit pattern 7b of the mold 7 is the same as being driven to the right side as indicated by the arrow 43.

FIG. 6B is a schematic diagram illustrating a state in which the alignment marks 10 on the mold side is aligned with the alignment marks 11 of the shot region based on roughness measurement and an imprint material has been supplied onto the substrate before the mold comes in contact with the substrate.

FIG. 6C is a schematic diagram illustrating a state in which the alignment marks 10 on the mold side match the alignment marks 11 of the shot region based on precision measurement while the mold is in contact with the substrate.

At this time, the overlap of the circuit pattern mark 40 on the mold side and the alignment mark 41 on the substrate side deviates by an amount of deviation 60.

Alternatively, the amount of deviation 60 is substantially equal to the amount of deviation 50 of the alignment mark from the circuit pattern mark illustrated in FIG. 5. In other words, the circuit pattern is transferred at a position deviating from the position at which the circuit pattern is supposed to be transferred on the substrate.

Thus, a method of aligning the circuit pattern at a target region on the substrate will be described using the following examples, taking the above issues into consideration.

Figure 7A:
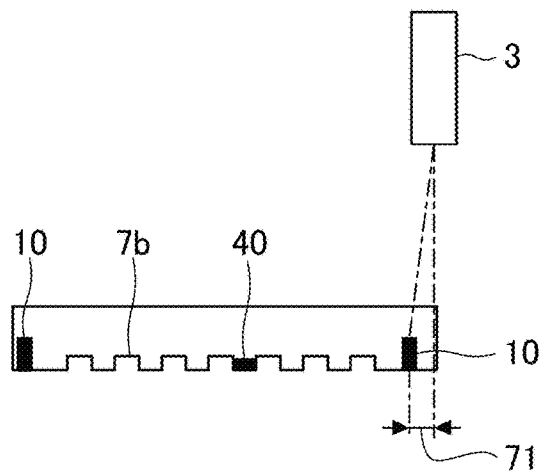
FIGS. 7A to 7D are schematic diagrams for describing a measurement process of alignment marks and a circuit pattern mark performed with reference to a reference mark according to the first embodiment.
Figure 7C:
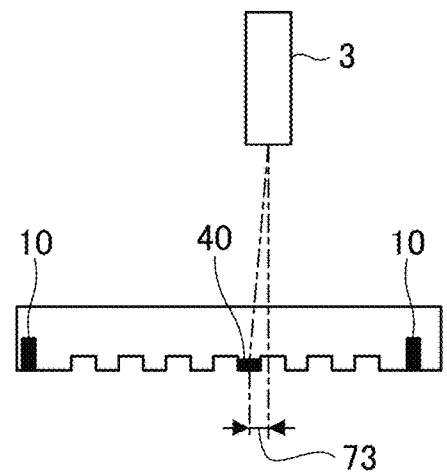
Figure 7B:
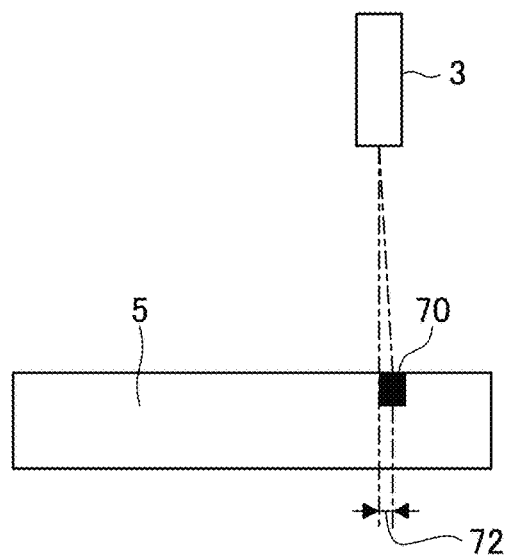
Figure 7D:
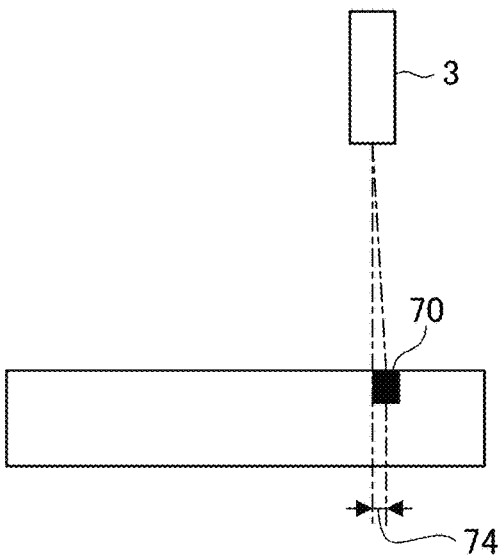

FIGS. 7A to 7D are schematic diagrams for describing a measurement process of the alignment marks and the circuit pattern mark performed with reference to a reference mark according to the first embodiment. FIGS. 7A and 7B are schematic diagrams for describing calculation of an amount of deviation of the alignment marks 10 of the mold from a reference of the substrate stage. In addition, FIGS. 7C and 7D are schematic diagrams for describing calculation of an amount of deviation of the circuit pattern marks 40 of the mold from a reference of the substrate stage.

A calculation method for an amount of deviation of the alignment marks of the mold from a reference of the substrate stage will be described. In order to measure the alignment marks 10 of the mold on which the circuit pattern 7b is formed with the measurement unit 3, first, the measurement unit 3 is driven in the X-Y direction to put the alignment marks 10 within the imaging field of view in accordance with the designed positions of the alignment marks 10.

Next, the alignment marks 10 are focused on by using a mold driving mechanism for the mold holding unit 4 and the measurement unit 3. For example, a position at which the alignment marks 10 have the highest contrast is assumed as a best focus position. In addition, imaging conditions are adjusted so that the illuminance of the alignment marks 10 in an image obtained by the imaging unit 25 falls within an allowable range.

Further, the imaging conditions include at least one of, for example, intensity of illumination light illuminating the circuit pattern mark 40, the wavelength of illumination light, a charge accumulation time of the imaging unit 25 that captures the circuit pattern mark 40, a gain of the imaging unit 25, or a value of the optical aperture of the imaging unit 25.

FIG. 7A illustrates a positional relationship between the measurement unit 3 and the alignment mark 10 on the circuit pattern 7b after focusing and adjustment of the imaging conditions are performed, and at this time, an amount of deviation 71 of the alignment mark 10 from the designed position thereof is calculated from an image acquired by the imaging unit 25.

Next, the substrate stage 5 is driven in the X-Y axis direction to the position of the measurement unit 3 that has driven in accordance with the designed position of the alignment marks 10 such that a reference mark 70 on the substrate stage 5 is placed right below the measurement unit 3. Next, the reference mark 70 is focused on by using the mold driving mechanism for the measurement unit 3. In addition, imaging conditions are adjusted so that the illuminance of the reference mark 70 in an image obtained by the imaging unit falls within an allowable range.

FIG. 7B illustrates a positional relationship between the measurement unit 3 and the reference mark 70 on the substrate stage after focusing and adjustment of the imaging conditions are performed, and at this time, an amount of deviation 72 of the reference mark 70 from the measurement unit 3 is calculated from an image acquired by the imaging unit.

Here, the gap between the "amount of deviation 71" and the "amount of deviation 72" is an amount of deviation 80 of the alignment mark 10 from the reference mark 70 on the substrate stage.

Next, a calculation method for an amount of deviation of the circuit pattern mark 40 of the mold from the reference of the substrate stage will be described. Basically, measurement is performed in the same manner as that for the alignment mark 10. The focus position and imaging conditions for the marks need to be adjusted considering characteristic differences of the marks, respectively. In addition, the circuit pattern mark 40 may be set as a mark of the circuit pattern in addition to an overlap mark on the layer of the circuit pattern.

First, the circuit pattern mark 40 of the mold on which the circuit pattern 7b is formed is measured by the measurement unit 3. To this end, the measurement unit 3 is driven in the X-Y direction to put the circuit pattern mark 40 within the imaging field of view in accordance with the designed position of the circuit pattern mark 40. Next, the circuit pattern mark 40 is focused on by using the mold driving mechanism for the mold holding unit 4 and the measurement unit 3. In addition, imaging conditions are adjusted so that the illuminance of the circuit pattern mark 40 in an image obtained by the imaging unit falls within an allowable range.

FIG. 7C illustrates a positional relationship between the measurement unit 3 and the circuit pattern mark 40 on the circuit pattern 7b after focusing and adjustment of the imaging conditions are performed, and at this time, an amount of deviation 73 of the circuit pattern mark 40 from the designed position thereof is calculated from an image acquired by the imaging unit.

Next, the substrate stage 5 is driven in the X-Y axis direction to the position of the measurement unit 3 that has driven in accordance with the designed position of the circuit pattern mark 40 such that the reference mark 70 on the substrate stage 5 is placed right below the measurement unit 3.

Next, the reference mark 70 is focused on by using the mold driving mechanism for the measurement unit 3. In addition, imaging conditions are adjusted so that the illuminance of the reference mark 70 in an image obtained by the imaging unit falls within an allowable range. As described above, the focus and the imaging conditions are adjusted respectively when the circuit pattern mark 40, the alignment mark 10, and the reference mark 70 are measured.

FIG. 7D illustrates a positional relationship between the measurement unit 3 and the reference mark 70 on the substrate stage after focusing and adjustment of the imaging conditions are performed, and at this time, an amount of deviation 74 of the reference mark 70 from the measurement unit 3 is calculated from an image acquired by the imaging unit.

Here, the gap between the "amount of deviation 73" and the "amount of deviation 74" is an amount of deviation 81 of the circuit pattern mark 40 from the reference mark 70 on the substrate stage. The measurement with reference to the reference mark on the substrate stage may be performed with reference to a mark on the substrate.

An amount of a relative positional deviation of the circuit pattern mark 40 from the alignment mark 10 (="amount of deviation 81"–"amount of deviation 80") is calculated from the amount of deviation 80 of the alignment mark 10 from the reference mark 70 and the amount of deviation 81 of the circuit pattern mark 40 from the reference mark 70. The amount of relative positional deviation can be said to be a deviation caused by the alignment mark 10 and the circuit pattern mark 40 formed on different layers (timings) in the manufacturing step.

FIG. 8 is a flowchart showing an example of an alignment method in which an amount of relative positional deviation between the circuit pattern mark 40 and the alignment mark 10 according to the first embodiment is calculated and the amount of relative positional deviation is reflected as a die-by-die alignment driving position.

Each step of the flowchart of FIG. 8 is performed by a CPU serving as a computer included in the control unit 12 executing a computer program stored in a memory. Further, the alignment method shown in the flowchart of FIG. 8 includes the process of the measurement unit 3 to measure relative positions of the alignment mark 10 and the circuit pattern mark 40, and it will be described below with reference to the schematic diagram of FIG. 9.

FIG. 9 is schematic diagrams illustrating an alignment process in which an amount of relative deviation between the alignment mark and the circuit pattern mark is calculated with reference to the reference mark according to the first embodiment.

Further, steps S81 to S86 of FIG. 8 are steps for controlling relative positions of the mold 7 and the substrate 8 based on a measurement result using the alignment mark 10 and the circuit pattern mark 40.

In step S81, the processing unit 26 causes the imaging unit 25 to capture the alignment mark 10 and the reference mark 70 to acquire an image thereof by using the method described with reference to FIGS. 7A and 7B above. Then, information of the position of the alignment mark 10 with respect to the reference mark 70 of the substrate stage is stored in the memory. Further, at that time, an image of a plurality of alignment marks may be captured and a plurality of pieces of position information thereof may be stored in the memory.

In step S82, the processing unit 26 causes the imaging unit 25 to capture the circuit pattern mark 40 and the reference mark 70 to acquire an image thereof by using the method described with reference to FIGS. 7C and 7D above. Then, information of the position of the circuit pattern mark 40 with respect to the reference mark 70 of the substrate stage is stored in the memory. Further, at this time, an image of a plurality of circuit pattern marks may be captured, and a plurality of pieces of position information thereof may be stored in the memory.

In step S83, the amount of relative positional deviation ("the amount of deviation 81"–"the amount of deviation 80") is calculated from the information of the position of the alignment mark 10 with respect to the reference mark 70 of the substrate stage and information of the position of the circuit pattern mark 40 with respect to the reference mark 70 of the substrate stage to determine an amount of die-by-die alignment drive 90.

The amount of die-by-die alignment drive 90 corresponds to the difference between the amount of relative deviation of the circuit pattern mark 40 from the alignment mark 10 in terms of design and the amount of relative positional deviation ("the amount of deviation 81"–"the amount of deviation 80") thereof.

As described above, the reference mark on the substrate stage or the substrate is measured, and the amount of drive is calculated from the amounts of relative positional deviation of the circuit pattern mark 40 and the alignment mark 10 from the reference mark. Further, at this time, at least one of an XY deviation, a rotational deviation, or a magnification deviation may be calculated as an amount of die-by-die alignment drive from the amount of relative deviation of the plurality of marks.

Further, steps S81 to S83 function as a calculation step of measuring the circuit pattern mark 40 near the pattern of the mold and the alignment mark 10 and calculating, as an amount of drive, an amount of relative positional deviation from the amount of relative deviation between the circuit pattern mark 40 and the alignment mark in terms of design. In addition, at this time, the control unit 12 functions as an acquisition unit (calculation unit).

In step S84, the processing unit 26 causes the imaging unit 25 to capture the alignment mark 10 of the mold 7 and the alignment mark 11 of the substrate 8 to acquire an image and calculates the amount of relative deviation between the alignment marks of the mold 7 and the substrate 8.

Figure 9A:
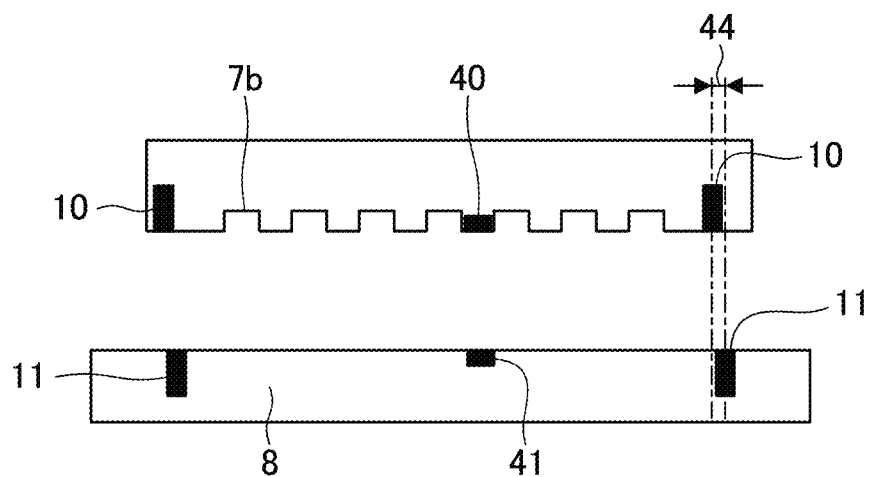
FIGS. 9A to 9C are schematic diagrams illustrating an alignment process in which an amount of relative deviation between an alignment mark and a circuit pattern mark is calculated with reference to a reference mark according to the first embodiment.

FIG. 9A is a schematic diagram illustrating a state in which the alignment mark 10 of the mold 7 and the alignment mark 11 of the substrate 8 are being measured, and reference numeral 44 indicates the amount of relative deviation between the alignment mark 10 of the mold 7 and the alignment mark 11 of the substrate 8.

In step S85, the control unit 12 aligns the mold 7 with the substrate 8 at the position deviating from the amount of relative deviation 44 between the alignment mark 10 and the alignment mark 11 calculated in step S84 by the amount of die-by-die alignment drive determined in step S83.

In other words, the alignment position is corrected to the position deviating from the position at which the amount of relative deviation 44 is zero by the amount of die-by-die alignment drive 90. Then, the mold 7 is driven to be in contact with the imprint material on the substrate 8.

Figure 9B:
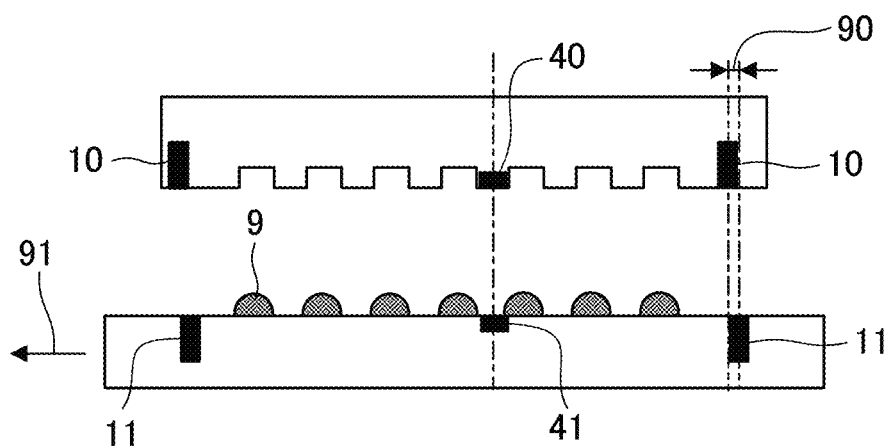

FIG. 9B is a schematic diagram in which the mold 7 and the substrate 8 are aligned at the position deviating from the amount of die-by-die alignment drive, and indicates the amount of die-by-die alignment drive calculated in step S83. In other words, in the first embodiment, the substrate stage is driven to the left side of the drawing in the direction of the arrow 91 so that the mold 7 and the substrate 8 deviate by the amount of die-by-die alignment drive 90.

Figure 9C:
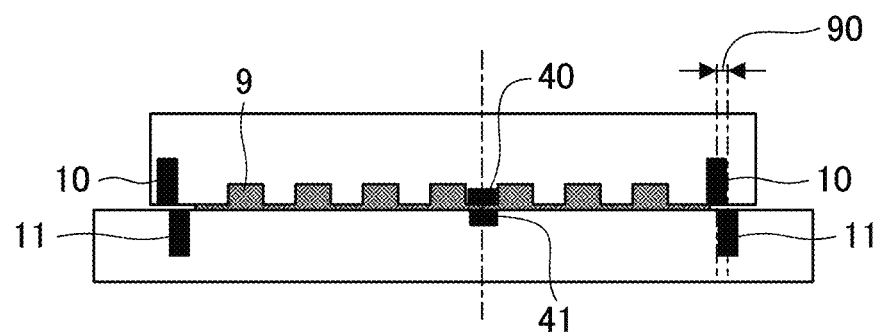

In step S86, alignment is performed at the position deviating from the target position of die-by-die alignment by the amount of die-by-die alignment drive 90 calculated in step S83 while the mold 7 is in contact with the imprint material on the substrate 8. FIG. 9C is a schematic diagram in which alignment is performed using die-by-die alignment while the mold 7 is in contact with the imprint material on the substrate 8.

Further, although alignment is performed at the position deviating by the amount of die-by-die alignment drive 90 before the contact in step S85 in the first embodiment, the present step is not essential, and alignment may be performed finally at a desired position in step S86.

Here, steps S84 to S86 function as alignment steps in which alignment is performed by reflecting an amount of deviation (an amount of drive) to an alignment target position during imprinting. In addition, at this time, the control unit 12 functions as an alignment unit.

Here, the mold and the substrate are aligned to be at an alignment position corrected based on the amount of relative positional deviation between the pattern mark near the pattern of the mold and the alignment mark of the mold obtained by measuring the pattern mark and the alignment mark.

Further, since the amount of relative positional deviation and the amount of drive that are the calculation results of step S83 do not change once acquired, the amounts may be stored in the memory or the like as information associated with the mold 7 used in the measurement. In such a case, when alignment is performed through die-by-die alignment using the same mold 7 next time, the amount of relative positional deviation (or the amount of drive) can be read from the memory and acquired, and used in steps S85 and S86.

In addition, although the example in which the amount of relative positional deviation is measured using the imprint device 1 has been described in the first embodiment, a value measured by an external measurement device may be acquired from an external storage unit or the like and used in alignment.

Alignment of the alignment marks 10 of the mold 7 and the alignment marks 11 of the substrate 8 is finished at the position deviating by the amount of die-by-die alignment drive 90 in the first embodiment as illustrated in FIG. 9C. Thus, the circuit pattern can be aligned in the target region with high accuracy when the circuit pattern mark 40 is aligned with the alignment mark 41 during imprinting.

Then, since the imprint material 9 is cured at the position at which alignment has been performed with high accuracy as described above, the circuit pattern formed of the cured material can be formed accurately at the desired position on the substrate.

Second Embodiment

Figure 10:
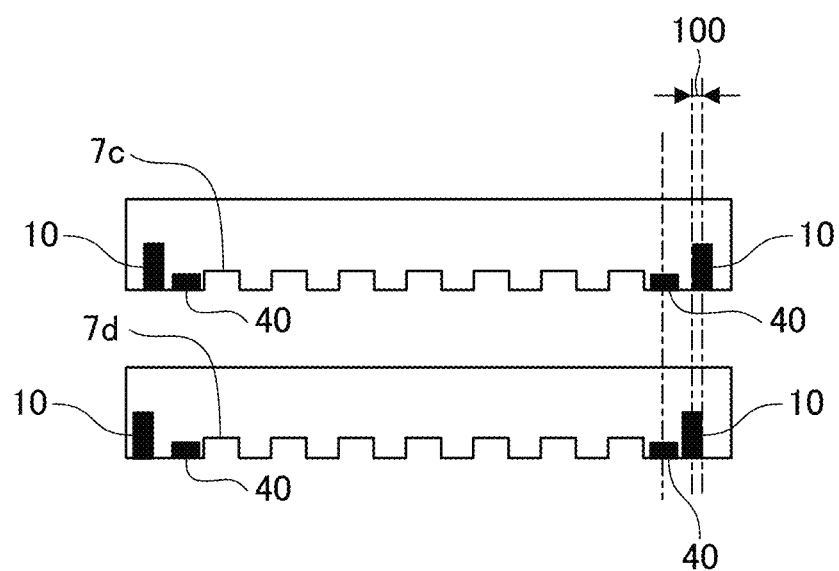
FIG. 10 is a schematic diagram for describing a relationship between alignment marks and a circuit pattern mark at a distance at which the marks fall within an imaging field of view according to a second embodiment.

FIG. 10 is a schematic diagram for describing a relationship between alignment marks and a circuit pattern mark at a distance at which the marks fall within an imaging field of view according to a second embodiment. A circuit pattern 7c of FIG. 10 is indicated having the alignment mark 10 deviating from the circuit pattern mark 40, and a circuit pattern 7d is indicated having the alignment mark 10 deviating from the circuit pattern mark 40 to the left side of the drawing by an amount of deviation 100.

Here, it is assumed in second embodiment that the alignment mark 10 and the circuit pattern mark 40 are disposed at the distance at which the alignment marks and the circuit pattern mark 40 falls within the imaging field of view of the imaging unit 25.

In other words, the circuit pattern mark 40 and the alignment mark 10 can be measured by the same measurement unit at the same time to acquire an amount of relative positional deviation in the second embodiment. A calculation method for an amount of relative deviation of the circuit pattern mark from the alignment mark of this case will be described.

The alignment mark 10 and the circuit pattern mark 40 of the mold on which the circuit pattern 7d is formed is measured by the measurement unit 3. To this end, first, the measurement unit 3 is driven in the X-Y direction to put the alignment mark and the circuit pattern mark 40 within the imaging field of view in accordance with the designed position of the alignment mark 10 and the circuit pattern mark 40. Next, the alignment marks 10 and the circuit pattern mark 40 are focused on by using the mold driving mechanism for the mold holding unit 4 and the measurement unit 3.

At that time, for example, a position at which the alignment mark 10 and the circuit pattern mark 40 have the highest contrast is assumed as a focus position. In addition, imaging conditions are adjusted so that the illuminance of the alignment mark and the circuit pattern mark 40 in an image obtained by the imaging unit 25 falls within an allowable range. The imaging conditions include at least one of, for example, intensity of illumination light, the wavelength of illumination light, or a charge accumulation time of the imaging unit 25.

After the imaging conditions are adjusted, an amount of relative deviation based on the positions of the alignment mark 10 and the circuit pattern mark 40 in the captured image is calculated. At this time, the focus of the alignment mark 10 and the circuit pattern mark 40 may be treated separately from the imaging conditions, and the positions of the alignment mark 10 and the circuit pattern mark 40 may be calculated from separate images.

Figure 11A:
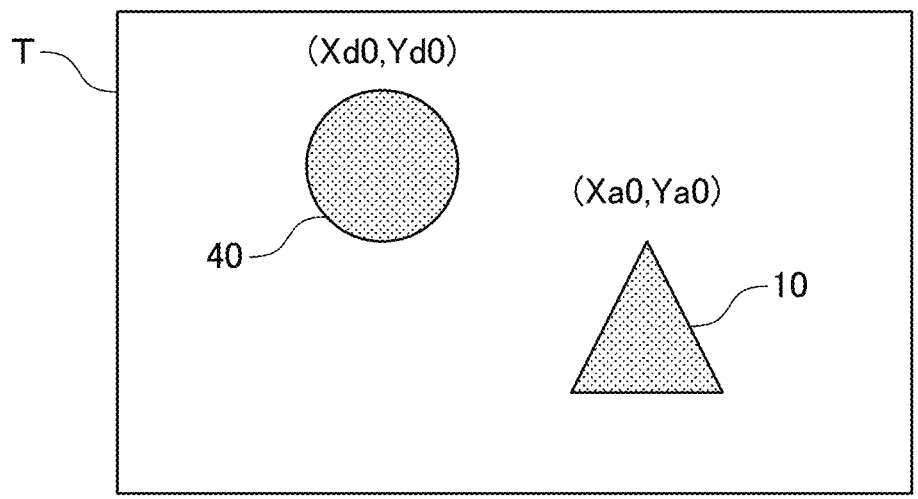
FIGS. 11A and 11B are schematic diagrams for describing a state in which the alignment mark and the circuit pattern mark are within the same imaging field of view.
Figure 11B:
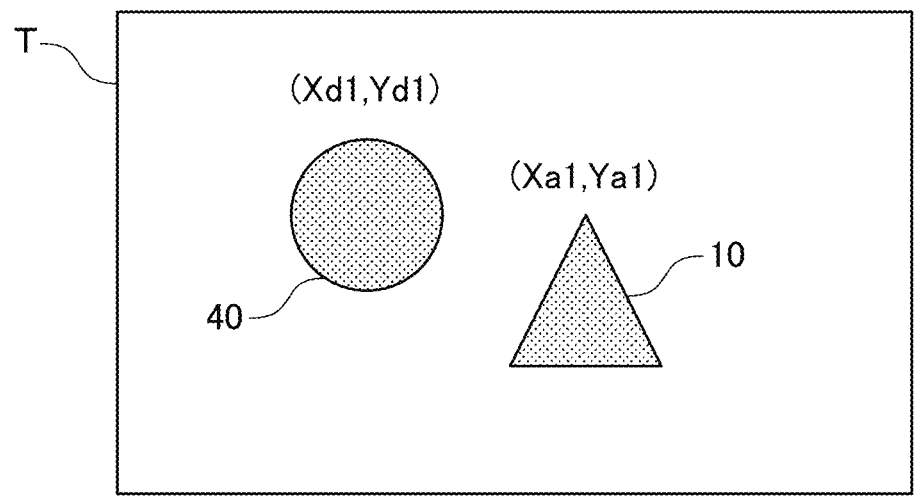

FIGS. 11A and 11B are schematic diagrams for describing a state in which the alignment mark and the circuit pattern mark are within the same imaging field of view. FIG. 11A illustrates designed coordinates of a case in which the centers (centers of gravity) of the alignment mark 10 and the circuit pattern mark 40 are set to be centers of an imaging field of view T when capturing an image.

FIG. 11B) illustrates the alignment mark 10 and the circuit pattern mark within the imaging field of view when the image of the circuit pattern 7*d* is actually captured. Here, an amount of relative deviation of the circuit pattern mark 40 from the alignment mark 10 is expressed by the following formula 1.

$$((Xd0-Xa0)-(Xd1-Xa1),(Yd0-Ya0)-(Yd1-Ya1)) \quad \text{(Formula 1)}$$

FIG. 12 is a flowchart showing an example of an alignment method in which an amount of relative deviation is reflected as a die-by-die alignment driving position. Each step of the flowchart of FIG. 12 is performed by a CPU serving as a computer included in the control unit 12 executing a computer program stored in a memory.

Figure 13A:
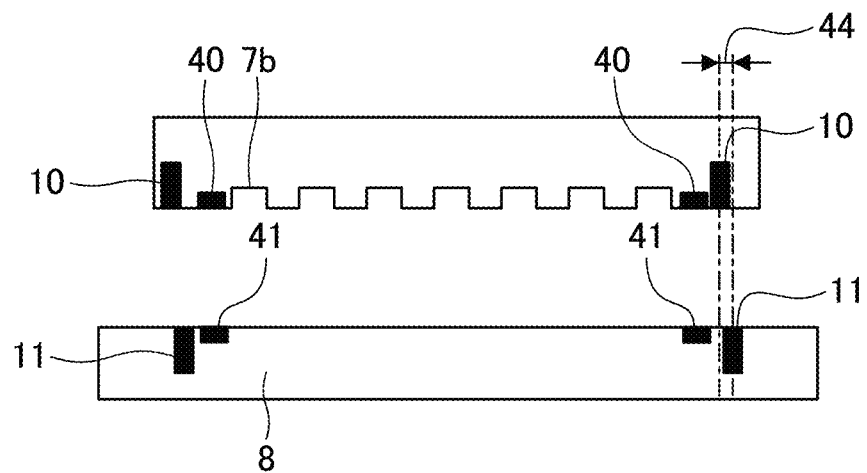
FIGS. 13A to 13C are schematic diagrams illustrating an alignment process in which the alignment marks and the circuit pattern mark are within the imaging field of view and an amount of relative deviation is calculated.
Figure 13B:
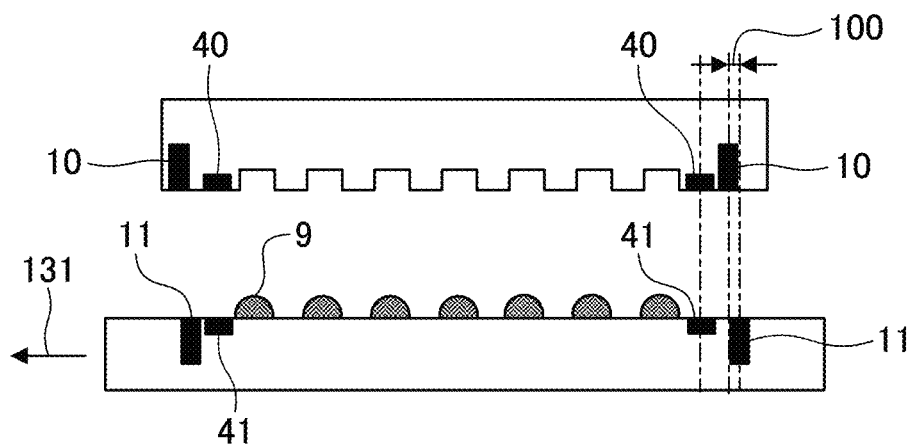
Figure 13C:
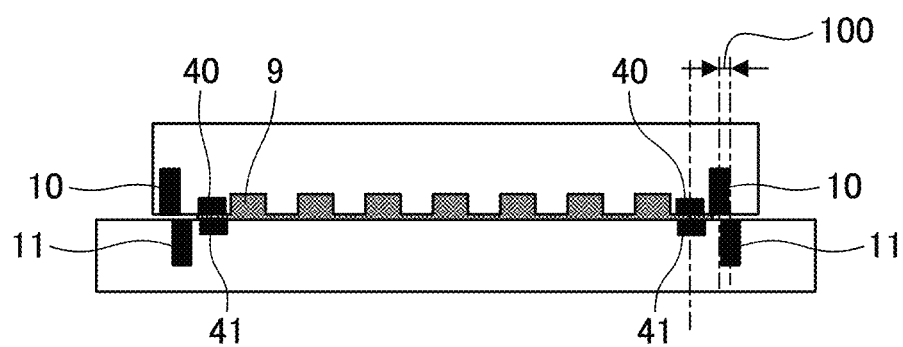

The alignment method shown in FIG. 12 includes a process of the measurement unit 3 to measure relative positions of the alignment mark 10 and the circuit pattern mark 40. The process will be described below with reference to the schematic diagram of FIG. 13. FIGS. 13A to 13C are schematic diagrams illustrating an alignment process in which the alignment mark and the circuit pattern mark are put within the imaging field of view at the same time and an amount of relative deviation is calculated and acquired.

In step S121, the processing unit 26 causes the imaging unit 25 to capture the alignment mark 10 and the circuit pattern mark 40 at the same time to acquire an image thereof by using the method described in FIG. 11. Then, the relative positions of the alignment mark 10 and the circuit pattern mark 40 are measured and stored in the memory. Further, an image of a plurality of alignment marks and circuit pattern marks may be captured to store a plurality of pieces of position information in the memory.

In step S122, the amount of die-by-die alignment drive 100 is determined based on the relative position (the amount of relative positional deviation) of the circuit pattern mark 40 with respect to the position of the alignment mark 10.

Here, the amount of die-by-die alignment drive corresponds to the difference between the amount of relative deviation of the circuit pattern mark 40 from the alignment mark 10 in terms of design and the amount of relative deviation acquired in step S121. Further, an XY deviation, a rotational deviation, or a magnification deviation may be calculated as an amount of die-by-die alignment drive from the plurality of amounts of relative deviation.

In step S123, the processing unit 26 causes the imaging unit 25 to capture the alignment mark 10 of the mold 7 and the alignment mark 11 of the substrate 8 to acquire an image and calculates the amount of relative deviation between the alignment mark 10 of the mold 7 and the alignment mark 11 of the substrate 8. FIG. 13A is a schematic diagram illustrating the alignment mark 10 of the mold 7 and the alignment mark 11 of the substrate 8 are being measured, and reference numeral 44 indicates the amount of relative deviation between the alignment marks of the mold 7 and the substrate 8.

In step S124, the control unit 12 aligns the mold 7 with the substrate 8 at the position deviating from the amount of relative deviation 44 between the alignment marks calculated in step S123 by the amount of die-by-die alignment drive 100 to drive the mold 7 to be contact with the substrate 8.

In other words, the alignment position is corrected to the position deviating from the position at which the amount of relative deviation 44 is zero by the amount of die-by-die alignment drive 100. Then, the mold 7 is driven to be in contact with the imprint material on the substrate 8.

FIG. 13B is a schematic diagram in which the mold 7 and the substrate 8 are aligned at the position deviating by the amount of die-by-die alignment drive 100. As illustrated in FIG. 13B, the substrate stage is driven to the left side of the drawing in the direction of the arrow 131 so that the mold 7 and the substrate 8 deviate by the amount of die-by-die alignment drive 100.

In step S125, alignment is performed at the position deviating from the target position of die-by-die alignment by the amount of die-by-die alignment drive 100 calculated in step S122 while the mold 7 is in contact with the substrate 8.

FIG. 13C is a schematic diagram illustrating the state in which alignment is performed at the position in the die-by-die alignment while the mold 7 is in contact with the substrate 8, and alignment for the alignment marks of the mold 7 and the substrate 8 is finished at the position deviating by the amount of die-by-die alignment drive 100

Further, although alignment is performed at the position deviating by the amount of die-by-die alignment drive 100 before the contact in step S124 in the second embodiment, the present step is not essential, and alignment may be performed finally at a desired position in step S125.

Further, since the amount of relative positional deviation and the amount of drive acquired in step S123 do not change once acquired, the amounts may be stored in the memory or the like as information associated with the mold 7 used in the measurement. In such a case, when alignment is performed through die-by-die alignment using the same mold 7 next time, the amount of relative positional deviation (or the amount of drive) can be read from the memory and acquired, and used in steps S124 and S125.

In addition, although the second embodiment has been described using the example in which an amount of relative positional deviation is measured by the imprint device 1, a value measured by an external measurement device may be temporarily stored in an external storage unit and the alignment unit may correct the alignment position based on the amount of relative positional deviation acquired from the storage unit.

Also in the second embodiment, the circuit pattern can be aligned in the target region with high accuracy when the circuit pattern mark 40 is aligned with the alignment mark 41 during imprinting as described above. Then, since the imprint material 9 is cured at the position at which alignment has been performed with high accuracy as described above, the circuit pattern formed of the cured material can be formed accurately at the desired position on the substrate.

Third Embodiment

Further, the amount of die-by-die alignment drive that is an amount of relative positional deviation between the circuit pattern mark 40 and the alignment mark 10 may be stored in the memory, or the like in advance as a fixed value. In that case, validity of the fixed value may be checked by performing steps S81 to S83 or S121 to S122 in which an amount of die-by-die alignment drive is calculated and comparing the amount with the fixed value.

In other words, the amount of relative positional deviation set as a fixed value may be compared with a value measured by the measurement unit for evaluation. Then, if there is a difference equal to or greater than a threshold between the fixed value and the calculated value, it is determined that the fixed value has an error, then the sequence may be stopped, or it may be promoted to check whether there is an error in the setting of the amount of die-by-die alignment drive.

Further, the article manufacturing method using the imprint device according to the above-described embodiments is suitable for manufacturing an article, for example, a micro-device such as a semiconductor device, an element having a microstructure. In addition, the article manufacturing method according to the above-described embodiments includes a step of forming a pattern on the imprint material applied onto the substrate using the imprint device (an imprint method) and a step of processing the substrate on which the pattern has been formed in the aforementioned step.

Furthermore, the manufacturing method includes other known steps (oxidization, film formation, vapor deposition, doping, planarization, etching, resist stripping, dicing, bonding, packaging, and the like). The article manufacturing method according to the above-described embodiments is advantageous in at least one of performance, quality, productivity, and production cost of an article, compared to methods of the related art.

Patterns of the cured material formed using the imprint device in the above-described embodiments are permanently used in at least some of various articles or temporarily used when various articles are manufactured. An article is an electric circuit element, an optical element, a MEMS, a recording element, a sensor, a mold, or the like.

Examples of the electric circuit element include a volatile or a non-volatile semiconductor memory such as a DRAM, an SRAM, a flash memory, or an MRAM, a semiconductor element such as an LSI, a CCD, an image sensor, or an FPGA, and the like. Examples of the mold include a mold for imprinting, and the like.

Such patterns of a cured material may be used as it is as a constituent member of at least a part of the article or temporarily used as a resist mask. The resist mask is removed after etching, ion implantation, and the like is performed in the substrate processing step.

Figure 14A:
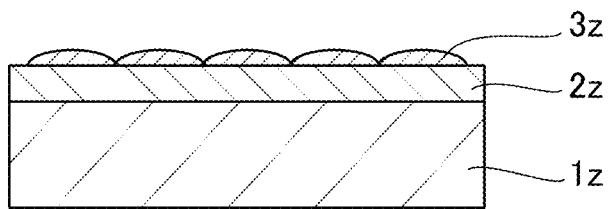
FIGS. 14A to 14F are diagrams for describing an example of an article manufacturing method.

Next, the article manufacturing method will be described in detail. FIGS. 14A to 14F are diagrams for describing an example of the article manufacturing method. A substrate 1z such as a silicon wafer with a surface on which a work material 2z such as an insulator is formed is provided and then an imprint material 3z is applied onto a surface of the work material 2z using an ink jet method or the like as illustrated in FIG. 14A. Here, the imprint material 3z in a plurality of droplets applied on the substrate is illustrated.

Figure 14B:
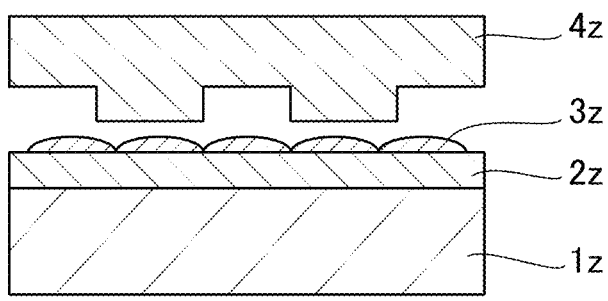
Figure 14C:
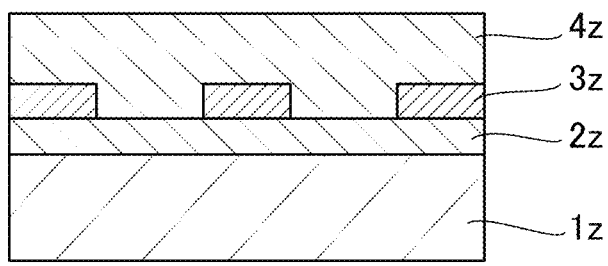

The side of a mold 4z on which an uneven pattern for imprinting is formed is set to face the imprint material 3z on the substrate as illustrated in FIG. 14B. The substrate 1z to which the imprint material 3z has been applied is brought in contact with the mold 4z as illustrated in FIG. 14C and pressure is imparted thereto. Thus, the gap between the mold 4z and the work material 2z is filled with the imprint material 3z. Light as energy for curing is radiated through the mold 4z in that state to cure the imprint material 3z.

Figure 14D:
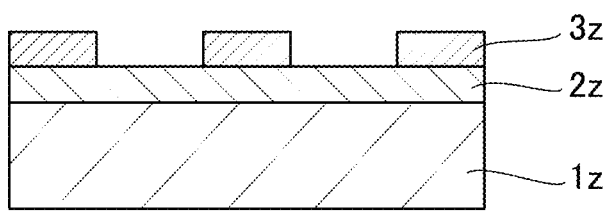

When the mold 4z is released from the substrate 1z after the imprint material 3z is cured, the pattern of the cured material of the imprint material 3z is formed on the substrate 1z as illustrated in FIG. 14D. The pattern of the cured material has the shape in which the concavity of the mold corresponds to the convexity of the cured material and the convexity of the mold corresponds to the concavity of the cured material. In other words, the uneven pattern of the mold 4z is transferred to the imprint material 3z.

Figure 14E:
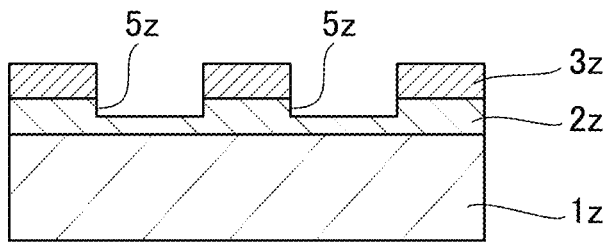
Figure 14F:
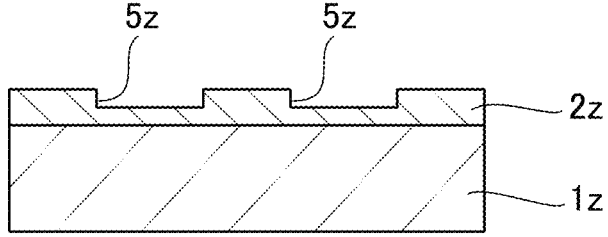

When etching is performed using the pattern of the cured material as an etching resistance mask, the portion on the surface of the work material 2z with no cured material or with a remaining thin cured material is removed, and grooves 5z are formed as illustrated in FIG. 14E. When the pattern of the cured material is removed, an article with the grooves 5z formed on the surface of the work material 2z can be obtained as illustrated in FIG. 14F.

Although the pattern of the cured material is removed here, it may not be removed after the processing and may be used as, for example, an interlayer insulating film included in a semiconductor element or the like, that is, a constituent member of an article.

According to the processes of the first embodiment to the third embodiment described above, the circuit pattern of the mold can be aligned in the target region with high accuracy by measuring the mark on the circuit pattern and the alignment marks even when the positional relationship between the circuit pattern and the alignment mark has a deviation. In addition, the circuit pattern mark and the alignment mark can be overlapped with a minimized positional deviation between an overlap mark on the mold 7 and an overlap mark on the substrate 8.

While the present invention has been described with reference to exemplary embodiments, it is to be understood that the invention is not limited to the disclosed exemplary embodiments. The scope of the following claims is to be accorded the broadest interpretation to encompass all such modifications and equivalent structures and functions. Further, the above first embodiment to the third embodiment, and the like may be appropriately combined.

In addition, as a part or the whole of the control according to the embodiments, a computer program realizing the function of the embodiments described above may be supplied to the imprint device through a network or various storage media. Then, a computer (or a CPU, an MPU, or the like) of the imprint device may be configured to read and execute the program. In such a case, the program and the storage medium storing the program configure the present invention.

This application claims the benefit of Japanese Patent Application No. 2022-090048, filed on Jun. 2, 2022, which is hereby incorporated by reference herein in its entirety.

What is claimed is:

1. An imprint device that performs an imprinting process in which a mold on which a pattern is formed is brought in contact with an imprint material on a substrate and the pattern is transferred to the substrate at a target position on the substrate, the imprint device comprising:

a mold holding unit configured to hold the mold that also includes an alignment mark and a pattern mark disposed closer to the pattern of the mold than the alignment mark;

a substrate holding unit configured to hold the substrate;

a radiation unit configured to radiate light to the imprint material to cure the imprint material;

a control unit configured to:
perform alignment by controlling positions of at least one of the mold holding unit or the substrate holding unit based on an amount of relative positional deviation between the pattern mark and the alignment mark; and control the radiation unit to radiate light to the imprint material an alignment position to cure the imprint material after performing the alignment, wherein the pattern of the mold and the pattern mark of the mold are formed on the mold at the same timing, and wherein the pattern of the mold and the alignment mark of the mold are formed on the mold at different timings.

2. The imprint device according to claim 1, wherein the control unit is configured to control the positions of at least one of the mold holding unit or the substrate holding unit based on a difference between the amount of relative positional deviation obtained by measuring the pattern mark and the alignment mark and an amount of relative deviation between the pattern mark and the alignment mark in terms of design.

3. The imprint device according to claim 1, wherein the control unit is configured to acquire information about the amount of relative positional deviation from a storage unit.

4. The imprint device according to claim 1, further comprising a measuring unit configured to acquire the amount of relative positional deviation by measuring the pattern mark and the alignment mark.

5. The imprint device according to claim 4, wherein the measurement unit is configured to concurrently capture an image of the pattern mark and the alignment mark to acquire the amount of relative positional deviation.

6. The imprint device according to claim 1, further comprising a measurement unit configured to measure a reference mark on the substrate holding unit or on the substrate and acquire the amount of relative positional deviation based on an amount of deviation of the pattern mark from the reference mark and an amount of deviation of the alignment mark from the reference mark.

7. The imprint device according to claim 1, further comprising a measurement unit configured to measure the amount of relative positional deviation by adjusting imaging conditions while the pattern mark and the alignment mark are measured.

8. The imprint device according to claim 7, wherein the imaging conditions include at least one selected from the group consisting of intensity of illumination light illuminating the pattern mark, a wavelength of the illumination light, a charge accumulation time of an imaging unit that captures the pattern mark, a gain of the imaging unit, and a value of an optical aperture of the imaging unit.

9. The imprint device according to claim 1, further comprising a measurement unit configured to measure the amount of relative positional deviation by adjusting a focus position of the pattern mark and a focus position of the alignment mark while the pattern mark and the alignment mark are measured.

10. An imprint method of performing an imprinting process in which a mold on which a pattern is formed is brought in contact with an imprint material on a substrate and the pattern is transferred to the substrate at a target position on the substrate, wherein the mold is held by a mold holding unit and the substrate is held by the substrate holding unit, and wherein the mold further includes an alignment mark and a pattern mark disposed closer to the pattern of the mold than the alignment mark, the imprint method comprising:

performing alignment by controlling positions of at least one of the mold holding unit or the substrate holding unit based on an amount of relative positional deviation between the pattern mark and the alignment mark; and controlling a radiation unit to radiating light to the imprint material at an alignment position to cure the imprint material after performing the alignment, wherein the pattern of the mold and the pattern mark of the mold are formed on the mold at the same timing, and wherein the pattern of the mold and the alignment mark of the mold are formed on the mold at different timings.

11. An article manufacturing method comprising:

bringing a mold on which a pattern is formed in contact with an imprint material on a substrate and performing imprinting by transferring the pattern to the substrate at a target position on the substrate, wherein the mold is held by a mold holding unit and the substrate is held by the substrate holding unit, and wherein the mold further includes an alignment mark and a pattern mark disposed closer to the pattern of the mold than the alignment mark;

performing alignment by controlling positions of at least one of the mold holding unit or the substrate holding unit based on an amount of relative positional deviation between the pattern mark and the alignment mark;

controlling a radiation unit to radiating light to the imprint material at an alignment position to cure the imprint material after performing the alignment; and forming the pattern on the substrate in the imprinting and then processing the substrate on which the pattern is formed, wherein the pattern of the mold and the pattern mark of the mold are formed on the mold at the same timing, and wherein the pattern of the mold and the alignment mark of the mold are formed on the mold at different timings.

12. A non-transitory computer-readable storage medium storing a computer program executable by a computer to execute an imprint method comprising:

bringing a mold on which a pattern is formed in contact with an imprint material on a substrate and performing imprinting by transferring the pattern to the substrate at a target position on the substrate, wherein the mold is held by a mold holding unit and the substrate is held by the substrate holding unit, and wherein the mold further includes an alignment mark and a pattern mark disposed closer to the pattern of the mold than the alignment mark;

performing alignment by controlling positions of at least one of the mold holding unit or the substrate holding unit based on an amount of relative positional deviation between the pattern mark and the alignment mark; and controlling a radiation unit to radiating light to the imprint material at an alignment position to cure the imprint material after performing the alignment, wherein the pattern of the mold and the pattern mark of the mold are formed on the mold at the same timing, and wherein the pattern of the mold and the alignment mark of the mold are formed on the mold at different timings.

* * * * *